(12) United States Patent
Nakamura et al.

(10) Patent No.: US 11,324,025 B2
(45) Date of Patent: May 3, 2022

(54) TERMINAL APPARATUS

(71) Applicants: SHARP KABUSHIKI KAISHA, Sakai (JP); FG Innovation Company Limited, Hong Kong (CN)

(72) Inventors: Osamu Nakamura, Sakai (JP); Ryota Yamada, Sakai (JP)

(73) Assignees: SHARP KABUSHIKI KAISHA, Sakai (JP); FG Innovation Company Limited, Hong Kong (CN)

( * ) Notice: Subject to any disclaimer, the term of this patent is extended or adjusted under 35 U.S.C. 154(b) by 0 days.

(21) Appl. No.: 17/276,632

(22) PCT Filed: Sep. 6, 2019

(86) PCT No.: PCT/JP2019/035163
§ 371 (c)(1),
(2) Date: Mar. 16, 2021

(87) PCT Pub. No.: WO2020/059537
PCT Pub. Date: Mar. 26, 2020

(65) Prior Publication Data
US 2021/0274527 A1  Sep. 2, 2021

(30) Foreign Application Priority Data
Sep. 20, 2018 (JP) .............................. JP2018-176138

(51) Int. Cl.
*H04W 72/04* (2009.01)
*H04W 28/06* (2009.01)
(Continued)

(52) U.S. Cl.
CPC ....... *H04W 72/1268* (2013.01); *H04L 5/0012* (2013.01); *H04W 72/0446* (2013.01); *H04W 72/0453* (2013.01)

(58) Field of Classification Search
CPC ......... H04W 72/1268; H04W 72/0446; H04W 72/0453; H04L 5/0012
See application file for complete search history.

(56) References Cited

U.S. PATENT DOCUMENTS

2018/0069593 A1* 3/2018 Yi ........................... H04B 1/707
2018/0109286 A1* 4/2018 Yao ....................... H04B 1/7143
(Continued)

FOREIGN PATENT DOCUMENTS

JP  2018-511191 A  4/2018
WO  2016/163071 A1  10/2016

OTHER PUBLICATIONS

U.S. Appl. No. 62/891,846, filed Aug. 23, 2019. (Year: 2019).*
(Continued)

*Primary Examiner* — Melvin C Marcelo
(74) *Attorney, Agent, or Firm* — ScienBiziP, P.C.

(57) ABSTRACT

Repeated transmission in a slot is efficiently performed with less control information. In a case that a parameter related to frequency hopping is configured to intra-slot hopping, a slot is divided into a first section and a second section and at least one demodulation reference signal is mapped to each of the first section and the second section. In a case that a parameter related to PUSCH repetition in a slot is enabled, a first section and a second section are generated according to a criterion identical to a criterion used in a case that information related to the frequency hopping is enabled, at least one demodulation reference signal is mapped to the first section and the second section, two PUSCHs generated from a same transport block are generated, and the two generated PUSCHs are mapped to the first section and the second section.

6 Claims, 9 Drawing Sheets

(51) Int. Cl.
*H04W 72/12* (2009.01)
*H04L 5/00* (2006.01)

(56) References Cited

U.S. PATENT DOCUMENTS

| 2018/0159656 | A1* | 6/2018 | Papasakellariou | H04L 1/00 |
| 2020/0221478 | A1* | 7/2020 | Fakoorian | H04W 72/1268 |
| 2021/0194556 | A1* | 6/2021 | Ly | H04L 5/005 |
| 2021/0218437 | A1* | 7/2021 | Khoshnevisan | H04B 1/713 |

OTHER PUBLICATIONS

R1-150286, NEC, 'Frequency Hopping Schemes for LTE Rel-13 MTC', 3GPP TSG RAN WG1 Meeting #80, Feb. 9-13, 2015, pp. 1-4. (Year: 2015).*

R1-151308, Nokia, 'Frequency Hopping for UEs in Coverage Enhancement', 3GPP TSG RAN WG1 Meeting #80bis, Apr. 20-24, 2015, pp. 1-3. (Year: 2015).*

3GPP TS 38.211 V15.2 0 (Jun. 2018), 3rd Generation Partnership Project; Technical Specification Group Radio Access Network; NR; Physical channels and modulation (Release 15).

Huawei et al., "New SID on Physical Layer Enhancements for NR URLLC", RP-181477, 3GPP TSG-RAN#80, La Jolla, US, Jun. 11-14, 2018.

Huawei et al., "Enhanced UL configured grant transmissions", R1-1808100, 3GPP TSG RAN WG1 Meeting #94, Gothenburg, Sweden, Aug. 20-24, 2018.

NTT DOCOMO, Inc., "Enhanced UL transmission with configured grant for URLLC", R1-1809165, 3GPP TSG RAN WG1 Meeting #94, Gothenburg, Sweden, Aug. 20-24, 2018.

Huawei et al., "Draft CR on UL data transmission procedure", R1-1804452, 3GPP TSG RAN WG1 Meeting #92bis, Sanya, China, Apr. 16-20, 2018.

Panasonic, "On NR URLLC L1 enhancements", R1-1808827, 3GPP TSG RAN WG1 Meeting #94, Gothenburg, Sweden, Aug. 20-24, 2018.

* cited by examiner

| SYMBOL PERIOD | DMRS POSITION ||||||||||||
|---|---|---|---|---|---|---|---|---|---|---|---|---|
| | PUSCH MAPPING TYPE A |||||||| PUSCH MAPPING TYPE B ||||
| | $l_0=2$ |||| $l_0=3$ |||| $l_0=0$ ||||
| | DMRS ADDITIONAL POSITION |||||||| DMRS ADDITIONAL POSITION ||||
| | 0 || 1 || 0 || 1 || 0 || 1 ||
| | FIRST HOP | SECOND HOP | FIRST HOP | SECOND HOP | FIRST HOP | SECOND HOP | FIRST HOP | SECOND HOP | FIRST HOP | SECOND HOP | FIRST HOP | SECOND HOP |
| ≤ 3 | – | – | – | – | – | – | – | – | 0 | 0 | 0 | 0 |
| 4 | 2 | 0 | 2 | 0 | 3 | 0 | 3 | 0 | 0 | 0 | 0 | 0 |
| 5, 6 | 2 | 0 | 2 | 0, 4 | 3 | 0 | 3 | 0, 4 | 0 | 0 | 0, 4 | 0, 4 |
| 7 | 2 | 0 | 2, 6 | 0, 4 | 3 | 0 | 3 | 0, 4 | 0 | 0 | 0, 4 | 0, 4 |

FIG. 4

TERMINAL APPARATUS

TECHNICAL FIELD

The present invention relates to a terminal apparatus. This application claims priority based on JP 2018-176138 filed on Sep. 20, 2018, the contents of which are incorporated herein by reference.

BACKGROUND ART

In a Long Term Evolution (LTE) communication system specified by Third Generation Partnership Project (3GPP), dynamic scheduling is specified in which a base station apparatus notifies a terminal apparatus of Downlink Control Information (DCI, grant) for performing data transmission by the notified DCI. In the dynamic scheduling, in a case that one piece of DCI is received, a single transmission is performed. Meanwhile, in addition to dynamic scheduling, Semi-Persistent Scheduling (SPS) for periodically allocating radio resources is specified. In the SPS, even in a case that one piece of DCI is received, periodic radio resource allocation is performed, so multiple times of data transmission can be performed.

Currently in 3GPP, with enhanced Mobile Broad Band (eMBB), Ultra-Reliable and Low Latency Communications (URLLC), and massive Machine-Type Communications (mMTC) as a use case, the standardization of the fifth generation mobile communication (New Radio, NR) is conducted. In NR Rel-15, Configured scheduling (CS), which is an extension of SPS of LTE, is specified. In the CS, repeated transmission of slots is possible and the reliability of the transmission can be improved.

In Rel-16, 3GPP is aiming to achieve further high reliability (packet reception success rate of 99.9999%) and low latency (from 0.5 ms to 1 ms delay). (NPL 2 and NPL3)

CITATION LIST

Non Patent Literature

NPL 1: 3GPP TS38.211, V15.2.0, "Physical channels and modulation (Release 15)".

NPL 2: Huawei, HiSilicon, Nokia, Nokia Shanghai Bell, "SID on Physical Layer Enhancements for NR URLLC", RP-181477.

NPL 3: Huawei, HiSilicon, "Enhanced UL configured grant transmissions", R1-1808100.

SUMMARY OF INVENTION

Technical Problem

In Rel-16, to achieve higher reliability and lower latency, repetitions of a signal in a slot has been studied. However, details have not been proposed. Meanwhile, for function extension, it is necessary that a terminal apparatus and a base station apparatus define a control signal and the control signal be transmitted.

An aspect of the present invention has been made in view of these circumstances, and an object of the present invention is to provide a control method for achieving lower latency.

Solution to Problem

To address the above-mentioned drawbacks, a base station apparatus, a terminal apparatus, and a communication method according to the present invention are configured as follows.

(1) One aspect of the present invention is a terminal apparatus including a receiver for performing communication with a base station apparatus and receiving higher layer signaling, the higher layer signaling including a parameter related to PUSCH repetition in a slot, a parameter related to a redundancy version pattern, and a parameter related to frequency hopping, the terminal apparatus comprising a controller configured to, in a case that intra-slot hopping is configured as the parameter related to the frequency hopping, divide a slot into a first section and a second section and map at least one demodulation reference signal to each of the first section and the second section, and in a case that information related to the PUSCH repetition in the slot is enabled, generates a first section and a second section according to a criterion identical to a criterion used in a case that the parameter related to the frequency hopping is enabled, and map at least one demodulation reference signal to each of the first section and the second section, wherein two PUSCHs generated from a same transport block are generated and the two generated PUSCHs are mapped to the first section and the second section.

(2) In one aspect of the present invention, the two generated PUSCHs are signals of different redundancy versions generated from the same transport block.

(3) In one aspect of the present invention, the different redundancy versions are determined based on the parameter related to the redundancy version pattern.

(4) In one aspect of the present invention, the controller determines the number of bits of the transport block in accordance with information related to MCS at least notified from the base station apparatus and the number of OFDM symbols other than the demodulation reference signal at least included in the first section, and generates a PUSCH to be transmitted in the first section and a PUSCH to be transmitted in the second section, based on the number of bits.

Advantageous Effects of Invention

According to one or more aspects of the present invention, the base station apparatus and the terminal apparatus can select whether to perform repetition in a slot.

BRIEF DESCRIPTION OF DRAWINGS

FIG. 4 is a diagram illustrating mapping of demodulation reference signals during the intra-slot frequency hopping application according to the first embodiment.

DESCRIPTION OF EMBODIMENTS

Figure 1:
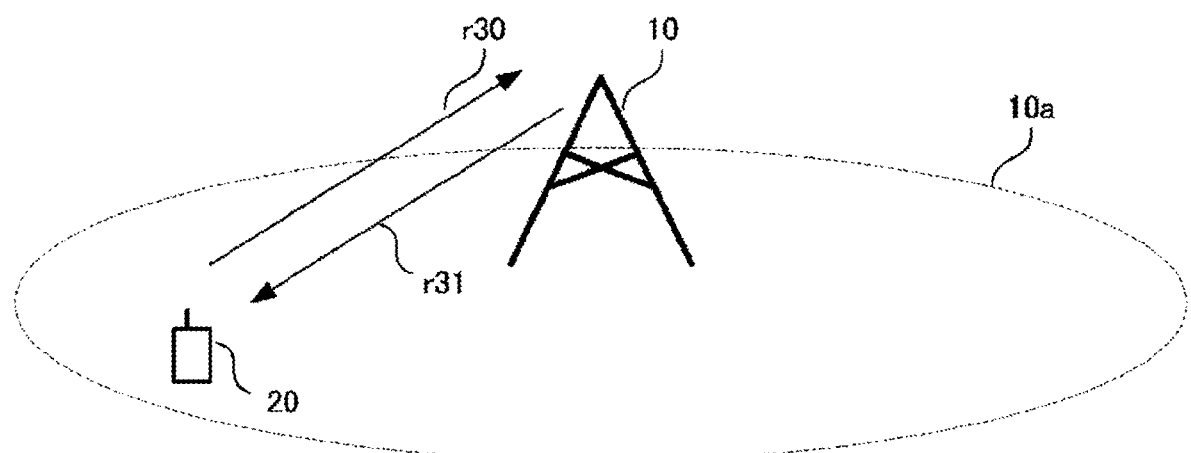
FIG. 1 is a diagram illustrating a configuration example of a communication system 1 according to a first embodiment.

A communication system according to the present embodiments includes a base station apparatus (a cell, a small cell, a serving cell, a component carrier, an eNodeB, a Home eNodeB, and a gNodeB) and a terminal apparatus (a terminal, a mobile terminal, and User Equipment (UE)). In the communication system, in a case of a downlink, the base station apparatus serves as a transmitting apparatus (a transmission point, a transmit antenna group, a transmit antenna port group, or a Tx/Rx Point (TRP)), and the terminal apparatus serves as a receiving apparatus (a reception point, a reception terminal, a receive antenna group, or a receive antenna port group). In a case of an uplink, the base station apparatus serves as a receiving apparatus, and the terminal apparatus serves as a transmitting apparatus. The communication system is also applicable to Device-to-Device (D2D, sidelink) communication. In this case, the terminal apparatus serves both as a transmitting apparatus and as a receiving apparatus.

The communication system is not limited to a communication system limited to data communication between a terminal apparatus involving a human and a base station apparatus. In other words, the communication system is also applicable to a form of data communication requiring no human intervention, such as Machine Type Communication (MTC), Machine-to-Machine (M2M) Communication, communication for Internet of Things (IoT), or Narrow Band-IoT (NB-IoT) (hereinafter referred to as MTC). In this case, the terminal apparatus serves as an MTC terminal. The communication system can use, in the uplink and the downlink, a multi-carrier transmission scheme, such as a Cyclic Prefix-Orthogonal Frequency Division Multiplexing (CP-OFDM). In a case that a higher layer parameter related to Transform precoder is configured, the communication system uses, in the uplink, a transmission scheme, such as a Discrete Fourier Transform Spread-Orthogonal Frequency Division Multiplexing (DFTS-OFDM, also referred to as an SC-FDMA) applying Transform precoding, or in other words, applying DFT. Although the following describes a case of using an OFDM transmission scheme in the uplink and the downlink, the transmission scheme is not limited to this and another transmission scheme is applicable.

The base station apparatus and the terminal apparatus according to the present embodiments can communicate in a frequency band for which an approval of use (license) has been obtained from the government of a country or region where a radio operator provides services, that is, a so-called licensed band, and/or in a frequency band for which no approval (license) from the government of the country or region is required, that is, a so-called unlicensed band.

According to the present embodiments, "X/Y" includes the meaning of "X or Y". According to the present embodiments, "X/Y" includes the meaning of "X and Y". According to the present embodiments, "X/Y" includes the meaning of "X and/or Y".

First Embodiment

FIG. 1 is a diagram illustrating a configuration example of a communication system 1 according to the present embodiment. The communication system 1 according to the present embodiment includes a base station apparatus 10 and a terminal apparatus 20. Coverage 10a is a range (a communication area) in which the base station apparatus 10 can connect to (communicate with) the terminal apparatus 20 (coverage 10a is also referred to as a cell). Note that the base station apparatus 10 can accommodate multiple terminal apparatuses 20 in the coverage 10a.

In FIG. 1, an uplink radio communication r30 at least includes the following uplink physical channels. The uplink physical channels are used for transmitting information output from a higher layer.

Physical Uplink Control Channel (PUCCH)
Physical Uplink Shared Channel (PUSCH)
Physical Random Access Channel (PRACH)

The PUCCH is a physical channel that is used to transmit Uplink Control Information (UCI). The uplink control information includes positive acknowledgement (ACK)/Negative acknowledgement (NACK) in response to the downlink data. Here, the downlink data indicates Downlink transport block, Medium Access Control Protocol Data Unit (MAC PDU), Downlink-Shared Channel (DL-SCH), Physical Downlink Shared Channel (PDSCH), and the like. The ACK/NACK is also referred to as a Hybrid Automatic Repeat request ACKnowledgement (HARQ-ACK), a HARQ feedback, a HARQ response, or a signal indicating HARQ control information or a delivery confirmation.

The NR supports at least five formats including PUCCH format 0, PUCCH format 1, PUCCH format 2, PUCCH format 3, and PUCCH format 4. Each of the PUCCH format 0 and the PUCCH format 2 includes 1 or 2 OFDM symbols, and the other PUCCHs each include 4 to 14 OFDM symbols. The bandwidth of each of the PUCCH format 0 and the PUCCH format 1 is configured with 12 subcarriers. In the PUCCH format 0, 1-bit (or 2-bit) ACK/NACK is transmitted on resource elements including 12 subcarriers and one OFDM symbol (or two OFDM symbols).

The uplink control information includes a Scheduling Request (SR) used to request a PUSCH (Uplink-Shared Channel (UL-SCH)) resource for initial transmission. The scheduling request indicates that the UL-SCH resource for initial transmission is requested.

The uplink control information includes downlink Channel State Information (CSI). The downlink channel state information includes a Rank Indicator (RI) indicating a preferable spatial multiplexing order (the number of layers), a Precoding Matrix Indicator (PMI) indicating a preferable precoder, a Channel Quality Indicator (CQI) designating a preferable transmission rate, and the like. The PMI indicates a codebook determined by the terminal apparatus. The codebook is related to precoding of the physical downlink shared channel.

In NR, higher layer parameter RI restrictions can be configured. There are multiple configuration parameters for RI restrictions, one of which is a type 1 single panel RI restriction and is constituted by eight bits. The type 1 single panel RI restriction, which is a bitmap parameter, forms a bit sequence $r_7, \ldots r_2, r_1$. Here, $r_7$ is the Most Significant Bit (MSB), and $r_0$ is the Least Significant Bit (LSB). In a case that $r_i$ is zero (i is 0, 1, . . . 7), PMI and RI reporting corresponding to precoder associated with i+1 layer are not acceptable. The RI restrictions include, in addition to the type 1 single panel RI restriction, a type 1 multi-panel RI restriction which includes four bits. The type 1 multi-panel RI restriction, which is a bitmap parameter, forms a bit sequence $r_4, r_3, r_2, r_1$. Here, $r_4$ is the MSB, and $r_0$ is the LSB.

In a case that $r_i$ is zero (i is 0, 1, 2, 3), PMI and RI reporting corresponding to precoder associated with i+1 layer are not acceptable.

The CQI can use an index (CQI index) indicative of a preferable modulation scheme (for example, QPSK, 16 QAM, 64 QAM, 256 QAMAM, or the like), a preferable coding rate, and a preferable frequency utilization efficiency in a prescribed band. The terminal apparatus selects, from the CQI table, a CQI index considered to allow a transport block on the PDSCH to be received within a block error probability (BLER) 0.1. However, in a case that a prescribed CQI table is configured by higher layer signaling, a CQI index considered to allow a transport block on the PDSCH to be received within BLER=0.00001 is selected from the CQI table.

The PUSCH is a physical channel used to transmit uplink data (an Uplink Transport Block, an Uplink-Shared Channel (UL-SCH)), and CP-OFDM or DFT-S-OFDM is applied as a transmission scheme. The PUSCH may be used to transmit the HARQ-ACK in response to the downlink data and/or the channel state information along with the uplink data. The PUSCH may be used to transmit only the channel state information. The PUSCH may be used to transmit only the HARQ-ACK and the channel state information.

The PUSCH is used to transmit radio resource control (Radio Resource Control (RRC)) signaling. The RRC signaling is also referred to as an RRC message/RRC layer information/an RRC layer signal/an RRC layer parameter/an RRC information element. The RRC signaling is information/signal processed in a radio resource control layer. The RRC signaling transmitted from the base station apparatus may be signaling common to multiple terminal apparatuses in a cell. The RRC signaling transmitted from the base station apparatus may be signaling dedicated to a certain terminal apparatus (also referred to as dedicated signaling). In other words, user equipment specific (user equipment unique) information is transmitted using the signaling dedicated to the certain terminal apparatus. The RRC message can include a UE Capability of the terminal apparatus. The UE Capability is information indicating a function supported by the terminal apparatus.

The PUSCH is used to transmit a Medium Access Control Element (MAC CE). The MAC CE is information/signal processed (transmitted) in a Medium Access Control layer. For example, a power headroom may be included in the MAC CE and may be reported via the physical uplink shared channel. In other words, a MAC CE field is used to indicate a level of the power headroom. The uplink data can include the RRC message and the MAC CE. The RRC signaling and/or the MAC CE is also referred to as a higher layer signal (higher layer signaling). The RRC signaling and/or the MAC CE are included in a transport block.

The PRACH is used to transmit a preamble used for random access. The PRACH is used to transmit a random access preamble. The PRACH is used for indicating the initial connection establishment procedure, the handover procedure, the connection re-establishment procedure, synchronization (timing adjustment) for uplink transmission, and the request for the PUSCH (UL-SCH) resource.

In the uplink radio communication, an Uplink Reference Signal (UL RS) is used as an uplink physical signal. The uplink physical signal is not used for transmission of information output from higher layers, but is used by the physical layer. The uplink reference signal includes a Demodulation Reference Signal (DMRS) and a Sounding Reference Signal (SRS). The DMRS is associated with transmission of the physical uplink-shared channel/physical uplink control channel. For example, the base station apparatus 10 uses the demodulation reference signal to perform channel estimation/channel compensation in a case of demodulating the physical uplink-shared channel/the physical uplink control channel.

The SRS is not associated with the transmission of the physical uplink shared channel/the physical uplink control channel. The base station apparatus 10 uses the SRS to measure an uplink channel state (CSI Measurement).

In FIG. 1, at least the following downlink physical channels are used in radio communication of the downlink r31. The downlink physical channels are used for transmitting information output from the higher layer.

Physical Broadcast Channel (PBCH)
Physical Downlink Control Channel (PDCCH)
Physical Downlink Shared Channel (PDSCH)

The PBCH is used for broadcasting a Master Information Block (MIB, a Broadcast Channel (BCH)) that is used commonly by the terminal apparatuses. The MIB is one of pieces of system information. For example, the MIB includes a downlink transmission bandwidth configuration and a System Frame number (SFN). The MIB may include information indicating at least some of numbers of a slot, a subframe, and a radio frame in which a PBCH is transmitted.

The PDCCH is used to transmit Downlink Control Information (DCI). For the downlink control information, multiple formats based on applications (also referred to as DCI formats) are defined. The DCI format may be defined based on the type and the number of bits of the DCI constituting a single DCI format. Each format is used depending on the application. The downlink control information includes control information for downlink data transmission and control information for uplink data transmission. The DCI format for the downlink data transmission is also referred to as a downlink assignment (or downlink grant). The DCI format for the uplink data transmission is also referred to as an uplink grant (or uplink assignment).

A single downlink assignment is used for scheduling a single PDSCH in a single serving cell. The downlink grant may be used for at least scheduling of the PDSCH within the same slot as the slot in which the downlink grant has been transmitted. The downlink assignment includes downlink control information, such as a frequency domain resource allocation for the PDSCH, a time domain resource allocation, a Modulation and Coding Scheme (MCS) for the PDSCH, a NEW Data Indicator (NDI) for indicating initial transmission or retransmission, information for indicating the HARQ process number in the downlink, and a Redundancy version for indicating an amount of redundancy added to the codeword during error correction coding. The codeword is data after the error correcting coding. The downlink assignment may include a Transmission Power Control (TPC) command for the PUCCH and a TPC command for the PUSCH. The uplink grant may include a Repetition number for indicating the number of repetitions for transmission of the PUSCH. Note that the DCI format for each downlink data transmission includes information (fields) required for the application among the above-described information.

A single uplink grant is used for notifying the terminal apparatus of scheduling of a single PUSCH in a single serving cell. The uplink grant includes uplink control information, such as information on the resource block allocation for transmission of the PUSCH (resource block allocation and hopping resource allocation), time domain resource allocation, information on the MCS for the PUSCH (MCS/Redundancy version), information on the DMRS ports, information on retransmission of the PUSCH, a TPC command for the PUSCH, and a request for downlink Channel State Information (CSI) (CSI request). The uplink grant may include information for indicating the HARQ process number in the uplink, a Transmission Power Control (TPC) command for the PUCCH, and a TPC command for the PUSCH. Note that the DCI format for each uplink data transmission includes information (fields) required for the application among the above-described information.

The OFDM symbol number (position) for transmitting the DMRS symbol is given by the period of signaling between the OFDM symbol at the beginning of the slot and the last OFDM symbol of the PUSCH resource scheduled in the slot, in a case of the PUSCH mapping type A without application of frequency hopping. In a case of the PUSCH mapping type B without application of frequency hopping, the OFDM symbol number (position) for transmitting the DMRS symbol is given by the scheduled PUSCH resource period. In a case that frequency hopping is applied, the OFDM symbol number (position) for transmitting the DMRS symbol is given by a period per hop. For the PUSCH mapping type A, only in a case that the higher layer parameter indicating the position of the leading DMRS is two, a case that the higher layer parameter indicating the number of additional DMRSs is three is supported. For the PUSCH mapping type A, a four-symbol period is only applicable in a case that the higher layer parameter indicating the position of the leading DMRS is two.

The PDCCH is generated by adding a Cyclic Redundancy Check (CRC) to the downlink control information. In the PDCCH, CRC parity bits are scrambled with a prescribed identifier (also referred to as an exclusive OR operation, mask). The parity bits are scrambled with a Cell-Radio Network Temporary Identifier (C-RNTI), a Configured Scheduling (CS)-RNTI, a Temporary C-RNTI, a Paging (P)-RNTI, a System Information (SI)-RNTI, or a Random Access (RA)-RNTI. The C-RNTI and the CS-RNTI are identifiers for identifying a terminal apparatus within a cell. The Temporary C-RNTI is an identifier for identifying the terminal apparatus that has transmitted a random access preamble in a contention based random access procedure. The C-RNTI and the Temporary C-RNTI are used to control PDSCH transmission or PUSCH transmission in a single subframe. The CS-RNTI is used to periodically allocate a resource for the PDSCH or the PUSCH. Here, the PDCCH (DCI format) scrambled with the CS-RNTI is used to activate or deactivate the CS type 2. On the other hand, control information (MCS, radio resource allocation, and the like) included in the PDCCH scrambled with the CS-RNTI in the CS type 1 is included in the higher layer parameter related to the CS, and the activation (configuration) of the CS is performed by the higher layer parameter. The P-RNTI is used to transmit a paging message (Paging Channel (PCH)). The SI-RNTI is used to transmit the SIB, and the RA-RNTI is used to transmit a random access response (a message 2 in a random access procedure).

The PDSCH is used to transmit the downlink data (the downlink transport block, DL-SCH). The PDSCH is used to transmit a system information message (also referred to as a System Information Block (SIB)). Some or all of the SIBs can be included in the RRC message.

The PDSCH is used to transmit the RRC signaling. The RRC signaling transmitted from the base station apparatus may be common to the multiple terminal apparatuses in the cell (unique to the cell). That is, the information common to the user equipments in the cell is transmitted using the RRC signaling unique to the cell. The RRC signaling transmitted from the base station apparatus may be a message dedicated to a certain terminal apparatus (also referred to as dedicated signaling). In other words, user equipment specific (user equipment unique) information is transmitted by using the message dedicated to the certain terminal apparatus.

The PDSCH is used to transmit the MAC CE. The RRC signaling and/or the MAC CE is also referred to as a higher layer signal (higher layer signaling). The PMCH is used to transmit multicast data (Multicast Channel (MCH)).

In the downlink radio communication in FIG. 1, a Synchronization Signal (SS) and a Downlink Reference Signal (DL RS) are used as downlink physical signals. The downlink physical signals are not used for transmission of information output from the higher layers, but are used by the physical layer.

The synchronization signal is used for the terminal apparatus to take synchronization in the frequency domain and the time domain in the downlink. The downlink reference signal is used for the terminal apparatus to perform the channel estimation/channel compensation on the downlink physical channel. For example, the downlink reference signal is used to demodulate the PBCH, the PDSCH, and the PDCCH. The downlink reference signal can be used for the terminal apparatus to measure the downlink channel state (CSI measurement).

The downlink physical channel and the downlink physical signal are also collectively referred to as a downlink signal. The uplink physical channel and the uplink physical signal are also collectively referred to as an uplink signal. The downlink physical channel and the uplink physical channel are also collectively referred to as a physical channel. The downlink physical signal and the uplink physical signal are also collectively referred to as a physical signal.

The BCH, the UL-SCH, and the DL-SCH are transport channels. Channels used in the Medium Access Control (MAC) layer are referred to as transport channels. A unit of the transport channel used in the MAC layer is also referred to as a Transport Block (TB) or a MAC Protocol Data Unit (PDU). The transport block is a unit of data that the MAC layer delivers to the physical layer. In the physical layer, the transport block is mapped to a codeword, and coding processing and the like are performed for each codeword.

Figure 2:
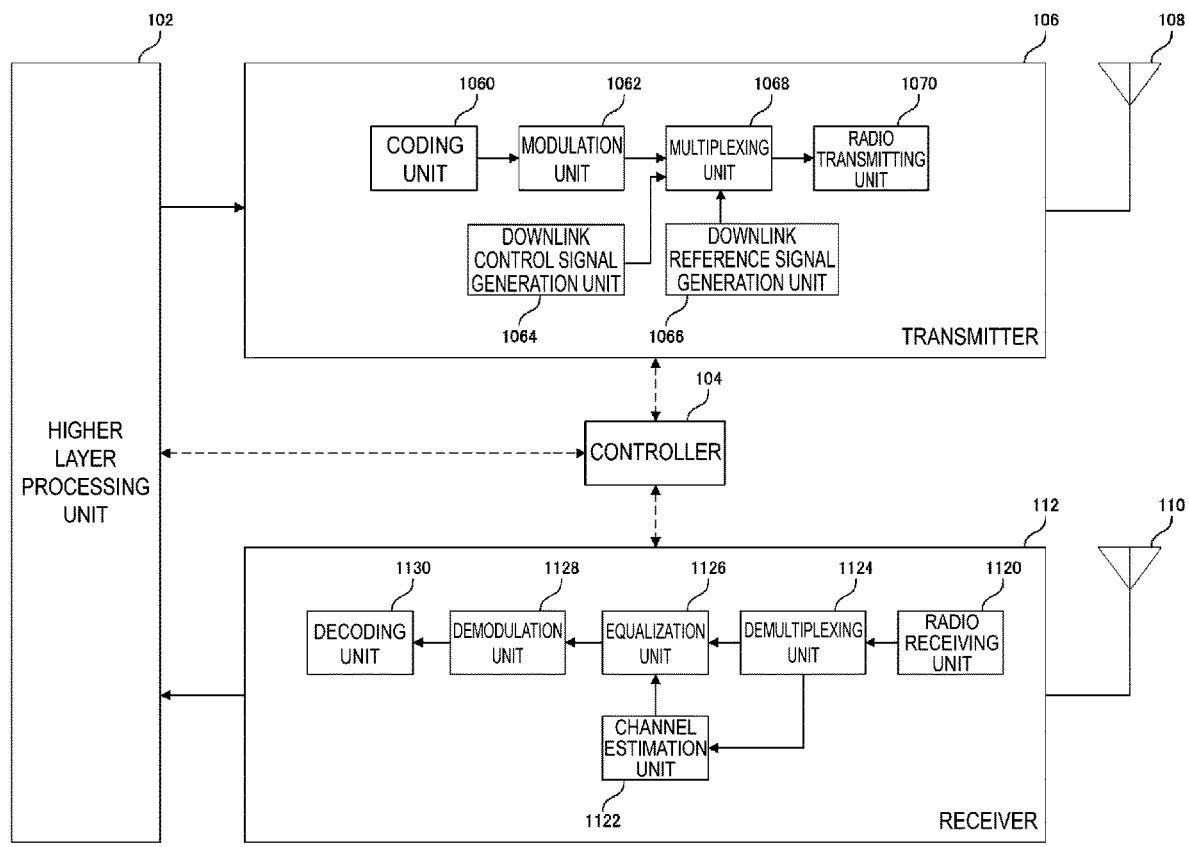
FIG. 2 is a diagram illustrating a configuration example of a base station apparatus according to the first embodiment.

FIG. 2 is a schematic block diagram of a configuration of the base station apparatus 10 according to the present embodiment. The base station apparatus 10 includes a higher layer processing unit (higher layer processing step) 102, a controller (control step) 104, a transmitter (transmitting step) 106, a transmit antenna 108, a receive antenna 110, and a receiver (receiving step) 112. The transmitter 106 generates the physical downlink channel in accordance with a logical channel input from the higher layer processing unit 102. The transmitter 106 includes a coding unit (coding step) 1060, a modulating unit (modulating step) 1062, a downlink control signal generation unit (downlink control signal generating step) 1064, a downlink reference signal generation unit (downlink reference signal generating step) 1066, a multiplexing unit (multiplexing step) 1068, and a radio transmitting unit (radio transmitting step) 1070. The receiver 112 detects (demodulates, decodes, or the like) the physical uplink channel and inputs the content to the higher layer processing unit 102. The receiver 112 includes a radio receiving unit (radio receiving step) 1120, a channel estimation unit (channel estimating step) 1122, a demultiplexing unit (demultiplexing step) 1124, an equalization unit (equalizing step) 1126, a demodulation unit (demodulating step) 1128, and a decoding unit (decoding step) 1130.

The higher layer processing unit 102 performs processing on a layer, such as a Medium Access Control (MAC) layer, a Packet Data Convergence Protocol (PDCP) layer, a Radio Link Control (RLC) layer, and a Radio Resource Control (RRC) layer, that is higher than the physical layer. The higher layer processing unit 102 generates information required to control the transmitter 106 and the receiver 112, and outputs the resultant information to the controller 104. The higher layer processing unit 102 outputs the downlink data (such as DL-SCH), the system information (MIB, SIB), and the like to the transmitter 106. Note that the DMRS configuration information may be notified to the terminal apparatus by using the system information (MIB or SIB), instead of the notification by using the higher layer such as RRC.

The higher layer processing unit 102 generates, or acquires from a higher node, the system information (a part of the MIB or the SIB) to be broadcasted. The higher layer processing unit 102 outputs the system information to be broadcasted to the transmitter 106 as BCH/DL-SCH. The MIB is allocated to the PBCH in the transmitter 106. The SIB is allocated to the PDSCH in the transmitter 106. The higher layer processing unit 102 generates, or acquires from a higher node, the system information (SIB) specific to the terminal apparatus. The SIB is allocated to the PDSCH in the transmitter 106.

The higher layer processing unit 102 configures various RNTIs for each terminal apparatus. The RNTI is used for encryption (scrambling) of the PDCCH, the PDSCH, and the like. The higher layer processing unit 102 outputs the RNTI to the controller 104/the transmitter 106/the receiver 112.

In a case that the downlink data (transport block, DL-SCH) allocated to the PDSCH, the system information specific to the terminal apparatus (System Information Block: SIB), the RRC message, the MAC CE, and the DMRS configuration information are not notified by using the system information, such as the SIB and the MIB, and the DCI, the higher layer processing unit 102 generates, or acquires from a higher node, the DMRS configuration information or the like and outputs the information generated or acquired to the transmitter 106. The higher layer processing unit 102 manages various kinds of configuration information of the terminal apparatus 20. Note that a part of the function of the radio resource control may be performed in the MAC layer or the physical layer.

The higher layer processing unit 102 receives information on the terminal apparatus, such as the function supported by the terminal apparatus (UE capability), from the terminal apparatus 20 (via the receiver 112). The terminal apparatus 20 transmits its own function to the base station apparatus 10 by a higher layer signaling (RRC signaling). The information on the terminal apparatus includes information for indicating whether the terminal apparatus supports a prescribed function or information for indicating that the terminal apparatus has completed introduction and testing of the prescribed function. The information for indicating whether the prescribed function is supported includes information for indicating whether the introduction and testing of the prescribed function have been completed.

In a case that the terminal apparatus supports the prescribed function, the terminal apparatus transmits information (parameters) for indicating whether the prescribed function is supported. In a case that the terminal apparatus does not support the prescribed function, the terminal apparatus may be configured not to transmit information (parameters) for indicating whether the prescribed function is supported. In other words, whether the prescribed function is supported is notified by whether information (parameters) for indicating whether the prescribed function is supported is transmitted. The information (parameters) for indicating whether the prescribed function is supported may be notified by using one bit of 1 or 0.

The higher layer processing unit 102 acquires the DL-SCH from the decoded uplink data (including the CRC) from the receiver 112. The higher layer processing unit 102 performs error detection on the uplink data transmitted by the terminal apparatus. For example, the error detection is performed in the MAC layer.

The controller 104 controls the transmitter 106 and the receiver 112 based on the various kinds of configuration information input from the higher layer processing unit 102/receiver 112. The controller 104 generates the downlink control information (DCI) based on the configuration information input from the higher layer processing unit 102/receiver 112, and outputs the generated downlink control information to the transmitter 106. For example, the controller 104 configures, based on the configuration information on the DMRS input from the higher layer processing unit 102/receiver 112 (whether the configuration is the DMRS configuration 1 or the DMRS configuration 2), the frequency allocation of the DMRS (an even subcarrier or an odd subcarrier in the case of DMRS configuration 1, and any of the zeroth to the second sets in the case of the DMRS configuration 2), and generates the DCI.

The controller 104 determines the MCS of the PUSCH in consideration of channel quality information (CSI Measurement result) measured by the channel estimation unit 1122. The controller 104 determines an MCS index corresponding to the MCS of the PUSCH. The controller 104 includes, in the uplink grant, the MCS index determined.

The transmitter 106 generates the PBCH, the PDCCH, the PDSCH, the downlink reference signal, and the like in accordance with the signal input from the higher layer processing unit 102/controller 104. The coding unit 1060 performs encoding (including repetition) using block code, convolutional code, turbo code, polar coding, LDPC code, or the like on the BCH, the DL-SCH, and the like input from the higher layer processing unit 102 by using a predetermined coding scheme/a coding scheme determined by the higher layer processing unit 102. The coding unit 1060 performs puncturing on the coded bits based on the coding rate input from the controller 104. The modulating unit 1062 performs data modulation on the coded bits input from the coding unit 1060 by using a predetermined modulation scheme (modulation order)/a modulation scheme (modulation order) input from the controller 104, such as the BPSK, QPSK, 16QAM, 64QAM, or 256QAM. The modulation order is based on the MCS index selected by the controller 104.

The downlink control signal generation unit 1064 adds the CRC to the DCI input from the controller 104. The downlink control signal generation unit 1064 encrypts (scrambles) the CRC by using the RNTI. Furthermore, the downlink control signal generation unit 1064 performs QPSK modulation on the DCI to which the CRC is added, and generates the PDCCH. The downlink reference signal generation unit 1066 generates a sequence known to the terminal apparatus as a downlink reference signal. The known sequence is determined by a predetermined rule based on a physical cell identity for identifying the base station apparatus 10 and the like.

The multiplexing unit 1068 multiplexes the PDCCHs/downlink reference signals/modulation symbols of the respective channels input from the modulating unit 1062. In other words, the multiplexing unit 1068 maps the PDCCHs/downlink reference signals/modulation symbols of the respective channels to the resource elements. The resource elements to which the mapping is performed are controlled by downlink scheduling input from the controller 104. The resource element is the minimum unit of a physical resource including one OFDM symbol and one subcarrier. Note that, in a case of performing MIMO transmission, the transmitter 106 includes the coding units 1060 and the modulating units 1062. Each of the number of the coding units 1060 and the number of the modulating units 1062 is equal to the number of layers. In this case, the higher layer processing unit 102 configures the MCS for each transport block in each layer.

The radio transmitting unit 1070 performs Inverse Fast Fourier Transform (IFFT) on the multiplexed modulation symbols and the like to generate OFDM symbols. The radio transmitting unit 1070 adds cyclic prefixes (CPs) to the OFDM symbols to generate a baseband digital signal. Furthermore, the radio transmitting unit 1070 converts the digital signal into an analog signal, removes unnecessary frequency components from the analog signal by filtering, performs up-conversion to a signal of a carrier frequency, performs power amplification, and outputs the resultant signal to the transmit antenna 108 for transmission.

In accordance with an indication from the controller 104, the receiver 112 detects (separates, demodulates, and decodes) the reception signal received from the terminal apparatus 20 through the receive antenna 110, and inputs the decoded data to the higher layer processing unit 102/controller 104. The radio receiving unit 1120 converts the uplink signal received through the receive antenna 110 into a baseband signal by down-conversion, removes unnecessary frequency components from the baseband signal, controls an amplification level such that a signal level is suitably maintained, performs orthogonal demodulation based on an in-phase component and an orthogonal component of the received signal, and converts the resulting orthogonally-demodulated analog signal into a digital signal. The radio receiving unit 1120 removes a part corresponding to the CP from the converted digital signal. The radio receiving unit 1120 performs Fast Fourier Transform (FFT) on the signal from which the CPs have been removed, and extracts a signal in the frequency domain. The signal in the frequency domain is output to the demultiplexing unit 1124.

The demultiplexing unit 1124 demultiplexes the signals input from the radio receiving unit 1120 into signals, such as the PUSCH, the PUCCH, and the uplink reference signal, based on uplink scheduling information (such as uplink data channel allocation information) input from the controller 104. The uplink reference signal resulting from the demultiplexing is input to the channel estimation unit 1122. The PUSCH and PUCCH resulting from the demultiplexing are output to the equalization unit 1126.

The channel estimation unit 1122 uses the uplink reference signal to estimate a frequency response (or a delay profile). The result of frequency response in the channel estimation for demodulation is input to the equalization unit 1126. The channel estimation unit 1122 measures the uplink channel state (measures a Reference Signal Received Power (RSRP), a Reference Signal Received Quality (RSRQ), and a Received Signal Strength Indicator (RSSI)) by using the uplink reference signal. The measurement of the uplink channel state is used to determine the MCS for the PUSCH and the like.

The equalization unit 1126 performs processing to compensate for an influence in a channel based on the frequency response input from the channel estimation unit 1122. As a method for the compensation, any existing channel compensation, such as a method of multiplying an MMSE weight or an MRC weight and a method of applying an MLD, is also applicable. The demodulation unit 1128 performs demodulation processing based on the information on a predetermined modulation scheme/modulation scheme indicated by the controller 104.

The decoding unit 1130 performs decoding processing on the output signal from the demodulation unit based on the information on a predetermined coding rate/coding rate indicated by the controller 104. The decoding unit 1130 inputs the decoded data (such as the UL-SCH) to the higher layer processing unit 102.

Figure 3:
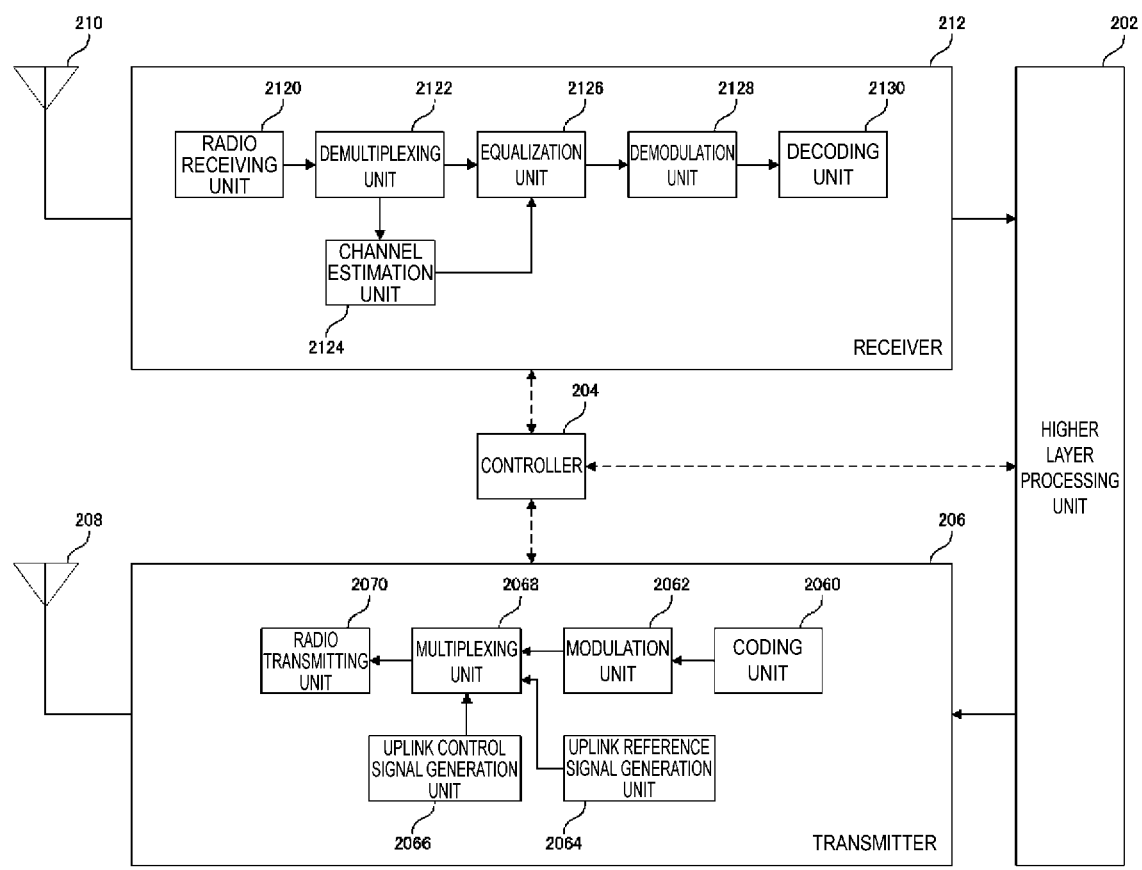
FIG. 3 is a diagram illustrating a configuration example of a terminal apparatus according to the first embodiment.

FIG. 3 is a schematic block diagram illustrating a configuration of the terminal apparatus 20 according to the present embodiment. The terminal apparatus 20 includes a higher layer processing unit (higher layer processing step) 202, a controller (control step) 204, a transmitter (transmitting step) 206, a transmit antenna 208, a receive antenna 210, and a receiver (receiving step) 212.

The higher layer processing unit 202 performs processing of the medium access control (MAC) layer, the packet data convergence protocol (PDCP) layer, the radio link control (RLC) layer, and the radio resource control (RRC) layer. The higher layer processing unit 202 manages various kinds of configuration information of the terminal apparatus itself. The higher layer processing unit 202 notifies the base station apparatus 10 of information for indicating terminal apparatus functions supported by the terminal apparatus itself (UE Capability) via the transmitter 206. The higher layer processing unit 202 notifies the UE Capability by RRC signaling.

The higher layer processing unit 202 acquires the decoded data, such as the DL-SCH and the BCH, from the receiver 212. The higher layer processing unit 202 generates the HARQ-ACK from a result of the error detection of the DL-SCH. The higher layer processing unit 202 generates the SR. The higher layer processing unit 202 generates the UCI including the HARQ-ACK/SR/CSI (including the CQI report). In a case that the DMRS configuration information is notified by the higher layer, the higher layer processing unit 202 inputs the information on the DMRS configuration to the controller 204. The higher layer processing unit 202 inputs the UCI and the UL-SCH to the transmitter 206. Note that some functions of the higher layer processing unit 202 may be included in the controller 204.

The controller 204 interprets the downlink control information (DCI) received via the receiver 212. The controller 204 controls the transmitter 206 in accordance with PUSCH scheduling/MCS index/Transmission Power Control (TPC), and the like acquired from the DCI for uplink transmission. The controller 204 controls the receiver 212 in accordance with the PDSCH scheduling/the MCS index and the like acquired from the DCI for downlink transmission. Furthermore, the controller 204 identifies the frequency allocation of the DMRS according to the information on the frequency allocation of the DMRS included in the DCI for downlink transmission and the DMRS configuration information input from the higher layer processing unit 202.

The transmitter 206 includes a coding unit (coding step) 2060, a modulating unit (modulating step) 2062, an uplink reference signal generation unit (uplink reference signal generating step) 2064, an uplink control signal generation unit (uplink control signal generating step) 2066, a multiplexing unit (multiplexing step) 2068, and a radio transmitting unit (radio transmitting step) 2070.

In accordance with the control by the controller 204 (in accordance with the coding rate calculated based on the MCS index), the coding unit 2060 codes the uplink data (UL-SCH) input from the higher layer processing unit 202 by convolutional coding, block coding, turbo coding, or the like.

The modulating unit 2062 modulates the coded bits input from the coding unit 2060 (generates modulation symbols for the PUSCH) by a modulation scheme indicated from the controller 204/modulation scheme predetermined for each channel, such as BPSK, QPSK, 16QAM, 64QAM, and 256QAM.

The uplink reference signal generation unit 2064 generates a sequence determined from a predetermined rule (formula), based on a physical cell identity (PCI), which is also referred to as a Cell ID, or the like, for identifying the base station apparatus 10, a bandwidth in which the uplink reference signals are mapped, a cyclic shift, parameter values to generate the DMRS sequence, further the frequency allocation, and the like, in accordance with an indication by the controller 204.

In accordance with the indication from the controller 204, the uplink control signal generation unit 2066 encodes the UCI, performs the BPSK/QPSK modulation, and generates modulation symbols for the PUCCH.

In accordance with the uplink scheduling information from the controller 204 (transmission interval in the Configured Scheduling (CS) for the uplink included in the RRC message, frequency domain and time domain resource allocation included in the DCI, and the like), the multiplexing unit 2068 multiplexes the modulation symbols for the PUSCH, the modulation symbols for the PUCCH, and the uplink reference signals for each transmit antenna port (DMRS port) (in other words, the respective signals are mapped to the resource elements).

Description will now be made with respect to configured scheduling (CS). As the information element of ConfiguredGrantConfig, which is RRC information for performing CS, a higher layer parameter (repK) related to the number of repetitions and a higher parameter (repK-RV) related to the RV during repetition may be configured. repK defines the number of repetitions applied to the transport block to be transmitted. repK-RV indicates the redundancy version pattern that is used to the repetitions. For an n-th transmission occasion during K time repetitions, the transmission associated with the (mod (n−1, 4)+1)-th value in the configured RV sequence (redundancy version pattern) is performed. The initial transmission of the transport block is started in the first transmission occasion of the K time repetitions in a case that the configured RV sequence is {0, 2, 3, 1}. In a case that the configured RV sequence is {0, 3, 0, 3}, the initial transmission of the transport block is started at any transmission occasion of K time repetitions associated with RV=0. In a case that the configured RV sequence is {0, 0, 0, 0}, the initial transmission of the transport block is started at any transmission occasion of K time repetitions, except for the last transmission occasion at K=8. For any RV sequence, the repetition is terminated after K time repeated transmissions, or either at the last transmission occasion during K time repetitions within the period P or at a time in which the uplink grant for scheduling the same transport block in the period P is received, whichever comes first. The terminal apparatus does not expect that a time period related to K time repeated transmissions that is longer than the time period calculated by the period P is configured. In a case that repK is configured, once, twice, four times, or eight times can be configured as the value. However, in a case that the RRC parameter itself is not present, the transmission is performed with the number of repetitions being one. repK-RV can be configured with any of {0, 2, 3, 1}, {0, 3, 0, 3}, and {0, 0, 0, 0}. Note that the different redundancy version signals generated from the same transport block are signals including the same transport block (information bit sequence) but are different in at least some of the coded bits configured.

In Rel-15, specification related to repetitions of slots is performed, but in the present embodiment, repeated transmission in a slot will be described. In Rel-15, frequency hopping has been specified as a technique for obtaining the frequency diversity effect. The frequency hopping is a technique in which the controller 204 performs control so as to divide the transport block after encoding in the coding unit 2060 into two, and to transmit the resultant transmission blocks by using frequency resources used in the first half (first hop, first section, first period) and the second half (second hop, second section, second period) of the slot in the multiplexing unit 2068. As a result, even in a case that one frequency performance is not good, a state can be generated such that transmission can be performed without errors by using signals in frequency resources with high gain at a time when the receiver performs decoding. In a case that the subcarrier spacings are 15 kHz, the slot length is 1 ms, and therefore, by using a part of the frequency hopping mechanism to suppress 0.5 ms delay, intra-slot repetition can be achieved with a minimum impact on the specification. That is, similar to frequency hopping, a slot including 14 OFDM symbols is divided into the first half with seven symbols (first hop) and the second half with seven symbols (second hop), and the same signal is transmitted in the first hop and the second hop. Here, each of the first hop and the second hop may be fewer than seven symbols, or different numbers of OFDM symbols may be used in the first hop and the second hop.

In order to explain the mechanism of intra-slot repetition according to the present embodiment, first, a detailed description of the frequency hopping will be given. In a case that a higher layer parameter (frequencyHopping) related to the frequency hopping is configured, the value can be configured to mode 1 or mode 2. The mode 2 is an inter-slot hopping, and is a mode in which the transmission is performed using multiple slots with each of the multiple slots having a different frequency. On the other hand, the mode 1 is an intra-slot hopping, and is a mode in which the transmission is performed using one or multiple slots with each of the one or multiple slots being divided into a first half and a second half, the first half and the second half having different frequencies. As for the frequency allocation of the frequency hopping, the radio resource allocation in the frequency domain notified by DCI or RRC applies to the first hop, and the frequency allocation of the second hop allocates a radio resource that is shifted, with respect to the radio resource used in the first hop, a certain value configured by a higher layer parameter (frequencyHoppingOffset) related to an amount of frequency hopping.

Next, the mapping of the DMRS in the case of performing frequency hopping will be described. The mapping of the DMRS in a case that the frequency hopping is enabled is performed based on FIG. 4. The numbers in the drawing represents the OFDM symbol indexes at which the DMRS is allocated. For example, in a case that the DMRS additional position is one in the PUSCH mapping type A and the start OFDM symbol index $l_0$=2, and the symbol period is seven, the controller 204 performs control such that the multiplexing unit 2068 allocates the DMRS to the second and sixth OFDM symbols in the first hop, and allocate the DMRS to the zeroth and fourth OFDM symbols in the second hop. In the above description, a case in which the symbol period is seven is described, but this similarly applies to values other than seven.

Next, a method for implementing intra-slot repetition with a minimum impact on specification by using the above-described frequency hopping mechanism as much as possible to perform the intra-slot repetition will be disclosed. Note that, mainly CS is described as a target, but the present invention can also be applied to a communication that allocates a PUSCH by a PDCCH scrambled with a C-RNTI, or to a PUCCH for transmitting (carrying) a control channel.

First, in a case that the higher layer processing unit configures a higher layer parameter related to an intra-slot repetition and the value is enabled, the controller of the terminal apparatus applies an intra-slot repetition. On the other hand, in a case that the higher layer parameter related to the intra-slot repetitions is configured to be disabled or in a case that the higher layer parameter related to the intra-slot repetition is not configured, the controller of the terminal apparatus does not apply the intra-slot repetition. Note that the values configured as the higher layer parameter related to the intra-slot repetitions is not limited thereto, and the values may be configured to be the mode 1, the mode 2, or the like in a case that there are multiple repetition patterns. The number of repetitions may be configured.

Figure 5:
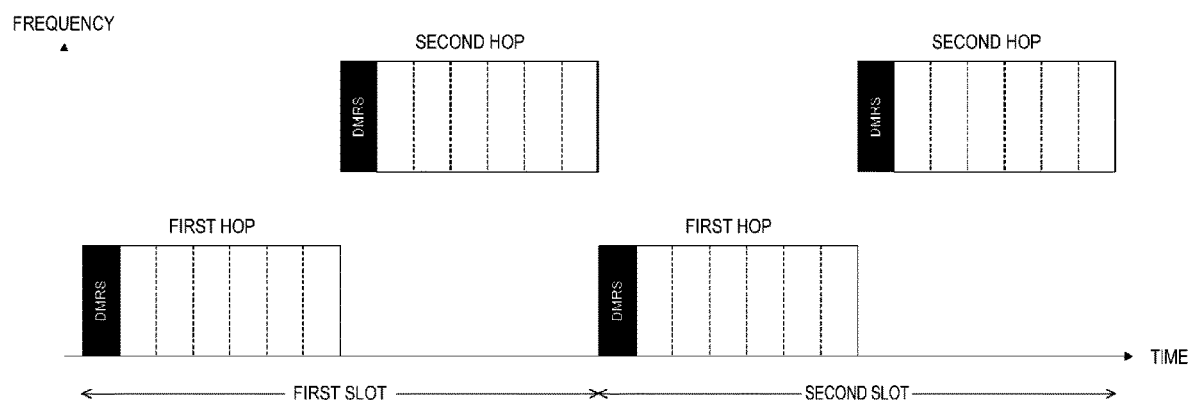
FIG. 5 is a diagram illustrating mapping of the PUSCHs during the intra-slot frequency hopping application according to the first embodiment.

Next, a combination of frequency hopping and intra-slot repetition will be described. In a case that the higher layer parameter (frequencyHopping) related to the frequency hopping is configured and the mode 2 is configured as the value, the multiplexing unit configures the slots and hops (hopping, mini-slot, hopping slot, short slot, or sub-slot) as illustrated in FIG. 5. In other words, an intra-slot hopping is applied. In this case, in a case that the higher layer parameter related to the intra-slot repetition is configured to be enabled, the controller performs control so as to transmit the same signal in the first hop and the second hop in FIG. 5. Here, the first hop and the second hop may be signals belonging to different redundancy versions (RVs). The RV signal to be transmitted is determined by the higher layer processing unit according to the higher layer parameter (repK-RV) related to the RV and is input to the controller. Here, in Rel-15, the intra-slot hopping is not specified, and therefore, for both type 1 and type 2 PUSCH transmissions using configured grant, in a case that the terminal apparatus is configured with the value configured as the higher layer parameter (repK) related to the number of repetitions and a value greater than one, the terminal apparatus repeatedly transmits the transport block a certain number of times, the certain number being repK in consecutive slots to which the same (OFDM) symbol mapping is applied. On the other hand, in a case that the intra-slot hopping is specified, in a state in which the mode 2 is configured as the frequency hopping, and that the higher layer parameter related to the intra-slot repetition is enabled, the controller performs control such that the repeated transmission is applied a certain number of times, the certain number being repK, not on a per slot basis but on a hopping unit basis. For example, in a case that the higher layer parameter related to the RV indicates {0, 2, 3, 1}, the controller performs control so as to perform the transmission of RV=0 in the first hop of the first slot in FIG. 5, perform the transmission of RV=2 in the second hop in the first slot, perform the transmission of RV=3 in the first hop of the second slot, and perform the transmission of RV=1 in the second hop of the second slot. In a case that the intra-slot repetition is applied in this manner, although four repetitions used to require four slots, four repetitions can be achieved in two slots. Note that the repetition does not need to be changed between hops, the same RV as that of the first hop may be applied to the second hop. The first hop may also be determined according to the higher layer parameter (repK-RV) related to the RV, and the second hop may be RV=0. The RV to apply to the second hop may be configured according to the higher layer parameter or defined as a system.

Figure 6:
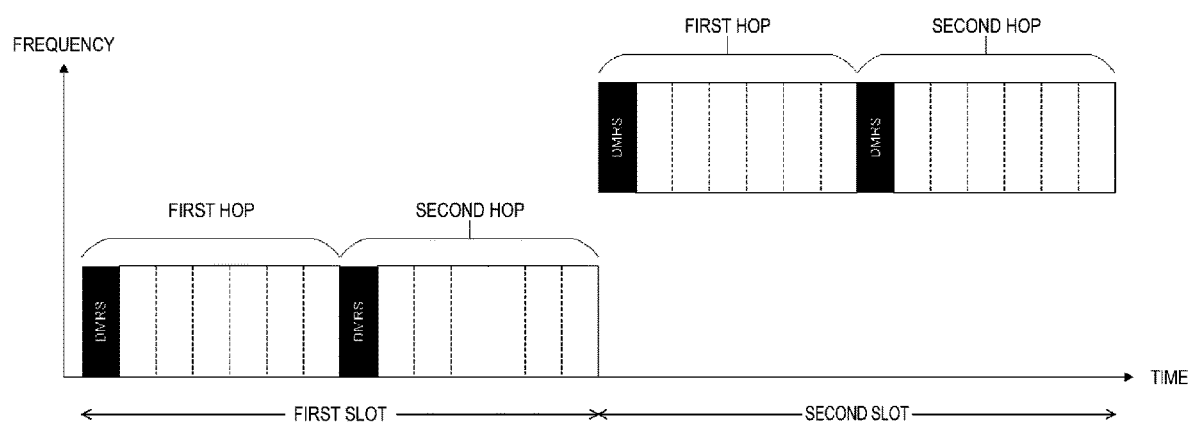
FIG. 6 is a diagram illustrating mapping of the PUSCHs in a case that the intra-slot repetition is applied during the inter-slot frequency hopping application according to the first embodiment.

Next, a case in which the mode 1 is configured as the higher layer parameter (frequencyHopping) related to the frequency hopping will be described. In a case that the higher layer parameter related to the intra-slot repetition is configured to be enabled and that the higher layer parameter (frequencyHopping) related to the frequency hopping is configured and the mode 1 is configured as the value, the multiplexing unit maps the signals in the radio resources to perform the frequency hopping in the slot unit as in FIG. 6. Because the higher layer parameter related to the intra-slot hopping is configured in the higher layer processing unit, the controller performs control such that the multiplexing unit generates the first hop and the second hop. As illustrated in FIG. 6, the DMRS is allocated to the beginning of the second hop, but no frequency hopping is applied, and the first hop and the second hop belonging to the same slot use the same frequency allocation. In a case that a transmission using multiple slots is performed, such as a case that a value greater than one is configured as the higher layer parameter related to the number of repetitions, the multiplexing unit maps the signals (PUSCHs) such that different frequency allocations are used between consecutive slots. As the description of the mode 2, for the RV and the like, it is possible to apply different RVs for each hop or apply the same RV between hops.

Figure 7:
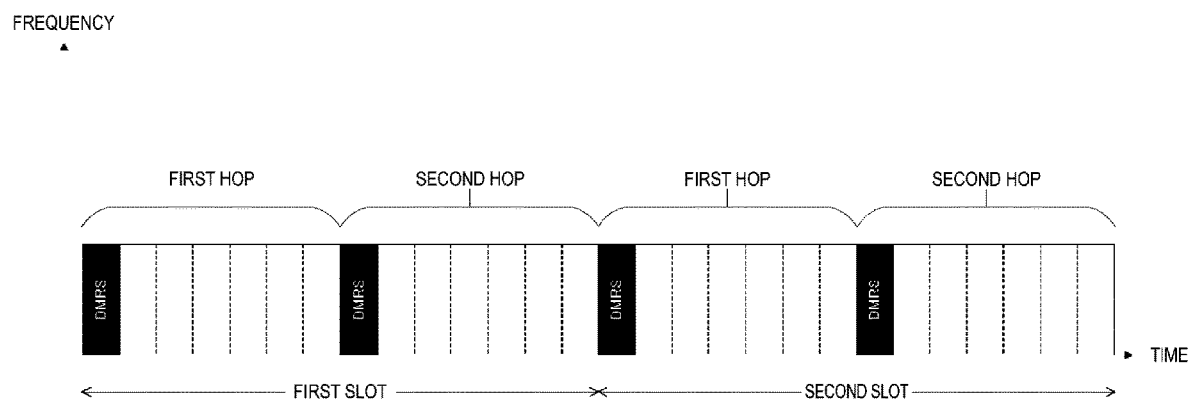
FIG. 7 is a diagram illustrating mapping of the PUSCHs in a case that the intra-slot repetition is applied in a case that the frequency hopping is not applied according to the first embodiment.

Next, a case in which the higher layer parameter (frequencyHopping) related to the frequency hopping is not configured (or is configured to not apply) will be described. In the higher layer processing unit, in a case that the higher layer parameter related to the frequency hopping is not configured, the multiplexing unit maps the signals (channels) such that no frequency hopping is performed as in FIG. 7. However, in a case that the higher layer parameter related to the intra-slot repetition is configured, the mode 1 is not configured as the higher layer parameter related to the frequency hopping, but the controller performs control such that the multiplexing unit generates the first hop and the second hop as illustrated in FIG. 7. Here, as a mapping of DMRS, the multiplexing unit uses a table (FIG. 4) similar to that in the case that the frequency hopping is applied. As illustrated in FIG. 7, the DMRS is allocated to the beginning of the second hop, but no frequency hopping is applied, and the multiplexing unit performs allocation of the PUSCHs such that the first hop and the second hop belonging to the same slot use the same frequency allocation. Even in a case that a transmission using multiple slots is performed, such as a case that a value greater than one is configured as the higher layer parameter related to the number of repetitions, the transmission is performed by using the same frequency allocation between consecutive slots. As for the RV and the like, the operation is similar to that in the description of the mode 1 and the mode 2, it is possible to apply a different RV for each hop or apply the same RV between hops (i.e., in a slot). Note that even in a case that the higher layer parameter indicating the number of additional DMRSs in the slot is one or greater than one, and the frequency hopping is disabled, in a case that the higher layer parameter related to the intra-slot repetition is enabled, then the controller may assume that the number of additional DMRSs of each hop is one, and one additional DMRS at maximum may be transmitted within the PUSCH period.

Figure 8:
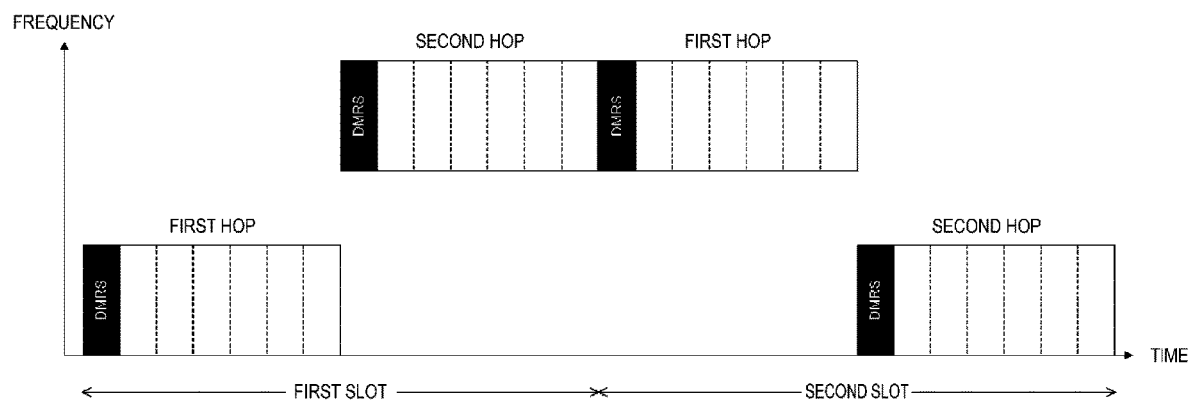
FIG. 8 is a diagram illustrating another example of mapping of the PUSCHs during the intra-slot frequency hopping application according to the first embodiment.

An example has been illustrated in which the hopping pattern described above uses the same frequency allocation between even numbered slots (or first hop), and uses the same frequency allocation between odd numbered slots (or second hop), but the present invention is not limited thereto. For example, as illustrated in FIG. 8, the same frequency allocation may be used in the first hop of the first slot and the second hop of the second slot, and the same frequency allocation may be used in the second hop of the first slot and the first hop of the second slot. In the case of this mapping, in a case that the higher layer processing unit is configured such that the redundancy version sequence is {0, 3, 0, 3}, the frequencies at which the PUSCHs having RV=0 and RV=3 are transmitted are not the same, so the frequency diversity effect can be obtained. Whether to perform the mapping of hops as in FIG. 8 or the hop mapping as in FIG. 4 may be configured by the higher layer parameter related to the frequency hopping or may be determined from the higher layer parameter related to the redundancy version pattern. In a case that such a configuration is performed by the higher layer parameter related to the frequency hopping, the configuration may be performed at a time when a configuration other than the mode 1 and the mode 2 is performed.

Figure 9:
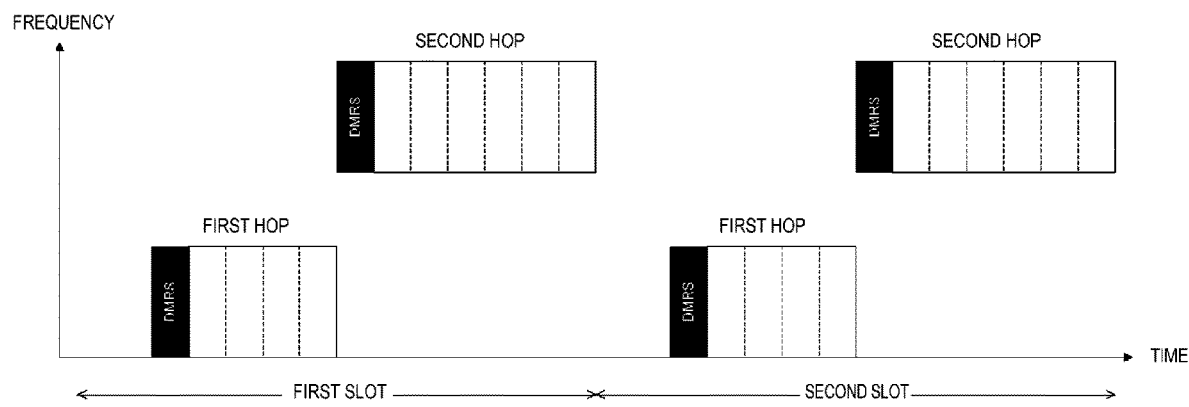
FIG. 9 is a diagram illustrating mapping of the PUSCHs during the intra-slot frequency hopping application in the PUSCH mapping type A according to the first embodiment.

Next, the number of OFDM symbols in each hop will be described. In FIG. 5 to FIG. 7, a case of the PUSCH mapping type B in which the DMRS additional position is zero and the symbol period is seven has been described as an example. In this case, because the number of DMRS symbols included in each hop is one, the number of OFDM symbols included in the first hop and the second hop is six. Because the number of OFDM symbols included in each hop is the same, it is possible to perform Chase combining on the signal transmitted in each hop. On the other hand, an example of a case of the PUSCH mapping type A in which the DMRS additional position is zero and the symbol period is seven is illustrated in FIG. 9. In FIG. 9, the number of OFDM symbols in the first hop is four, and the number of OFDM symbols in the second hop is six, and the numbers do not match. In this case, a problem arises in that the chase combining cannot be performed on the signal transmitted in each hop. Thus, in a case that the intra-slot repetition is performed, that is, in a case that the higher layer parameter related to the intra-slot repetition is configured to be enabled, the PUSCH mapping type may be limited to B. For example, in a case that the PUSCH mapping type A is configured, it is assumed that the controller does not apply the intra-slot repetition regardless of the configuration of the higher layer parameter related to the intra-slot repetition. Alternatively, in a case that the higher layer parameter related to the intra-slot repetition is configured to be enabled, the multiplexing unit may perform mapping as the PUSCH mapping type B, regardless of the configuration of the PUSCH mapping type. Note that in a case that the configuration of the PUSCH mapping type is notified by the DCI, and in a case that the higher layer parameter related to the intra-slot repetition is configured to be enabled, the controller may discard the DCI in a case that the field related to the time domain resource allocation in DCI indicates the PUSCH mapping type A.

In a case that the number of OFDM symbols used in the PUSCH of the first hop and the number of OFDM symbols used in the PUSCH of the second hop are different from each other, the controller may determine the transmission signal, based on the smaller number of OFDM symbols. For example, in a case that the number of OFDM symbols used in the PUSCH of the first hop is four and the number of OFDM symbols used in the PUSCH of the second hop is six as in FIG. 9, the PUSCH may be generated based on the first hop having a smaller number of symbols, and the same signal may be allocated to the first hop. However, because the two symbols are redundant, the multiplexing unit may map the DMRS in the redundant OFDM symbols, or the multiplexing unit may copy and map any of the generated four OFDM symbols. Here, the RV may be changed in accordance with higher layer parameters in the first hop and the second hop.

As a different method, in a case that the number of OFDM symbols used in the PUSCH of the first hop and the number of OFDM symbols used in the PUSCH of the second hop are different from each other, it is conceivable that the controller performs control so as to determine the transport block size (number of transmission information bits), based on a parameter related to the MCS notified from the base station and the smaller number of OFDM symbols (first hop), and generate the PUSCH of the first hop and the second in accordance with the calculated transport block size. In other words, because the number of OFDM symbols of the second hop is larger, the coding rate of the second hop is lower. In this manner, in a case that the numbers of OFDM symbols are different from each other in the first hop and the second hop, that is, in the PUSCH mapping type A, the intra-slot repetition can be applied by using the information bit sequence used for the PUSCH generation common to the first hop and the second hop. In this case, however, the receiver performs Incremental Redundancy (IR) rather than the chase combining, or in other words, bit Log-Likelihood Ratio (LLR) combining of coded bits rather than the combining of the modulation symbols. Note that the MCS notified from the base station apparatus is notified in a higher layer parameter in the case of the CS type 1 and in the DCI format for activation in the case of the CS type 2.

The radio transmitting unit 2070 performs Inverse Fast Fourier Transform (IFFT) on the multiplexed signals to generate OFDM symbols. The radio transmitting unit 2070 adds CPs to the OFDM symbols to generate a baseband digital signal. Furthermore, the radio transmitting unit 2070 converts the baseband digital signal into an analog signal, removes unnecessary frequency components from the analog signal, converts the signal into a signal of a carrier frequency by up-conversion, performs power amplification, and transmits the resultant signal to the base station apparatus 10 via the transmit antenna 208.

The receiver 212 includes a radio receiving unit (radio receiving step) 2120, a demultiplexing unit (demultiplexing step) 2122, a channel estimation unit (channel estimating step) 2144, an equalization unit (equalizing step) 2126, a demodulation unit (demodulating step) 2128, and a decoding unit (decoding step) 2130.

The radio receiving unit 2120 converts the downlink signal received through the receive antenna 210 into a baseband signal by down-conversion, removes unnecessary frequency components from the baseband signal, controls an amplification level such that a signal level is suitably maintained, performs orthogonal demodulation based on an in-phase component and an orthogonal component of the received signal, and converts the resulting orthogonally-demodulated analog signal into a digital signal. The radio receiving unit 2120 removes a part corresponding to the CP from the digital signal resulting from the conversion, performs the FFT on the signal from which the CP has been removed, and extracts a signal in the frequency domain.

The demultiplexing unit 2122 separates the extracted signal in the frequency domain into the downlink reference signal, the PDCCH, the PDSCH, and the PBCH. A channel estimation unit 2124 uses the downlink reference signal (such as the DM-RS) to estimate a frequency response (or delay profile). The result of frequency response in the channel estimation for demodulation is input to the equalization unit 1126. The channel estimation unit 2124 measures the uplink channel state (measures a Reference Signal Received Power (RSRP), a Reference Signal Received Quality (RSRQ), a Received Signal Strength Indicator (RSSI), and a Signal to Interference plus Noise power Ratio (SINR)) by using the downlink reference signal (such as the CSI-RS). The measurement of the downlink channel state is used to determine the MCS for the PUSCH and the like. The measurement result of the downlink channel state is used to determine the CQI index and the like.

The equalization unit 2126 generates an equalization weight based on an MMSE criterion, from the frequency response input from the channel estimation unit 2124. The equalization unit 2126 multiplies the input signal (the PUCCH, the PDSCH, the PBCH, and the like) from the demultiplexing unit 2122 by the equalization weight. The demodulation unit 2128 performs demodulation processing based on information of the predetermined modulation order/the modulation order indicated by the controller 204.

The decoding unit 2130 performs decoding processing on the output signal from the demodulation unit 2128 based on information of the predetermined coding rate/the coding rate indicated by the controller 204. The decoding unit 2130 inputs the decoded data (such as the DL-SCH) to the higher layer processing unit 202.

A program running on an apparatus according to the present invention may serve as a program that controls a Central Processing Unit (CPU) and the like to cause a computer to operate in such a manner as to realize the functions of the above-described embodiment according to the present invention. Programs or the information handled by the programs are temporarily read into a volatile memory, such as a Random Access Memory (RAM) while being processed, or stored in a non-volatile memory, such as a flash memory, or a Hard Disk Drive (HDD), and then read by the CPU to be modified or rewritten, as necessary.

Note that the apparatuses in the above-described embodiments may be partially enabled by a computer. In that case, a program for realizing the functions of the embodiments may be recorded on a computer readable recording medium. This configuration may be realized by causing a computer system to read the program recorded on the recording medium for execution. It is assumed that the "computer system" refers to a computer system built into the apparatuses, and the computer system includes an operating system and hardware components such as a peripheral device. The "computer-readable recording medium" may be any of a semiconductor recording medium, an optical recording medium, a magnetic recording medium, and the like.

Moreover, the "computer-readable recording medium" may include a medium that dynamically retains a program for a short period of time, such as a communication line that is used for transmission of the program over a network such as the Internet or over a communication line such as a telephone line, and may also include a medium that retains a program for a fixed period of time, such as a volatile memory within the computer system for functioning as a server or a client in such a case. The above-described program may be one for realizing some of the above-described functions, and also may be one capable of realizing the above-described functions in combination with a program already recorded in a computer system.

Each functional block or various characteristics of the apparatuses used in the above-described embodiments may be implemented or performed on an electric circuit, that is, typically an integrated circuit or multiple integrated circuits. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. The general-purpose processor may be a microprocessor or may be a processor of known type, a controller, a micro-controller, or a state machine instead. The above-mentioned electric circuit may include a digital circuit, or may include an analog circuit. In a case that with advances in semiconductor technology, a circuit integration technology appears that replaces the present integrated circuits, it is also possible to use an integrated circuit based on the technology.

Note that the invention of the present patent application is not limited to the above-described embodiments. In the embodiment, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Various modifications are possible within the scope of the present invention defined by claims, and embodiments that are made by suitably combining technical means disclosed according to the different embodiments are also included in the technical scope of the present invention. A configuration in which constituent elements, described in the respective embodiments and having mutually the same effects, are substituted for one another is also included in the technical scope of the present invention.

INDUSTRIAL APPLICABILITY

The present invention can be preferably used in a base station apparatus, a terminal apparatus, and a communication method.

The invention claimed is:

1. A terminal apparatus configured to communicate with a base station apparatus, the terminal apparatus comprising:
   transmission circuitry configured to transmit a physical uplink shared channel (PUSCH) repeatedly in each of a plurality of consecutive slots and over the plurality of consecutive slots; and
   higher layer processing circuitry configured to configure radio resource control (RRC) signaling including a first parameter and a second parameter in which the first parameter indicates a quantity of repetitions for the PUSCH repeatedly transmitted in each slot included in the plurality of consecutive slots and the second parameter indicates whether a first frequency hopping method or a second frequency hopping method is applied in which a frequency hopping is applied per the PUSCH repeatedly transmitted in the first frequency hopping method and the frequency hopping is applied per each slot included in the plurality of consecutive slots in the second frequency hopping method, wherein in a case where the second parameter indicates that the first frequency hopping method is applied, the transmission circuitry is configured to apply, based on the first parameter and the second parameter, the frequency hopping per the PUSCH repeatedly transmitted, and in a case where the second parameter indicates that the second frequency hopping method is applied, the transmission circuitry is configured to apply, based on the second parameter, the frequency hopping per each slot included in the plurality of consecutive slots.

2. The terminal apparatus according to claim 1, wherein in a case where a field related to a time-domain resource allocation indicates a second configuration related to an allocation of the PUSCH out of a first configuration related to an allocation of the PUSCH and the second configuration, the transmission circuitry repeatedly transmits the PUSCH in each of the plurality of consecutive slots, in the first configuration, an orthogonal frequency division multiplexing (OFDM) symbol number for transmitting a demodulation reference signal (DMRS) symbol is given by a period between an initial OFDM symbol of one slot included in the plurality of consecutive slots and a last OFDM symbol of a resource of the PUSCH scheduled in the one slot in a case of the frequency hopping being not applied, and in the second configuration, the OFDM symbol number for transmitting the DMRS symbol is given by a period per the frequency hopping, and the DMRS is used for demodulating the PUSCH.

3. A base station apparatus configured to communicate with a terminal apparatus, the base station apparatus comprising:

reception circuitry configured to receive a physical uplink shared channel (PUSCH) repeatedly in each of a plurality of consecutive slots and over the plurality of consecutive slots; and higher layer processing circuitry configured to configure radio resource control (RRC) signaling including a first parameter and a second parameter in which the first parameter indicates a quantity of repetitions for the PUSCH repeatedly transmitted in each slot included in the plurality of consecutive slots and the second parameter indicates whether a first frequency hopping method or a second frequency hopping method is applied in which a frequency hopping is applied per the PUSCH repeatedly transmitted in the first frequency hopping method and the frequency hopping is applied per each slot included in the plurality of consecutive slots in the second frequency hopping method, wherein in a case where the second parameter indicates that the first frequency hopping method is applied, the reception circuitry is configured to receive the PUSCH to which the frequency hopping is applied based on the first parameter and the second parameter per the PUSCH repeatedly transmitted, and in a case where the second parameter indicates that the second frequency hopping method is applied, the reception circuitry is configured to receive the PUSCH to which the frequency hopping is applied based on the second parameter per each slot included in the plurality of consecutive slots.

4. The base station apparatus according to claim 3, wherein in a case where a field related to a time-domain resource allocation indicates a second configuration related to an allocation of the PUSCH out of a first configuration related to an allocation of the PUSCH and the second configuration, the reception circuitry receives the PUSCH repeatedly transmitted in each of the plurality of consecutive slots, in the first configuration, an orthogonal frequency division multiplexing (OFDM) symbol number for transmitting a demodulation reference signal (DMRS) symbol is given by a period between an initial OFDM symbol of one slot included in the plurality of consecutive slots and a last OFDM symbol of a resource of the PUSCH scheduled in the one slot in a case of the frequency hopping being not applied, and in the second configuration, the OFDM symbol number for transmitting the DMRS symbol is given by a period per the frequency hopping, and the DMRS is used for demodulating the PUSCH.

5. A communication method for a terminal apparatus configured to communicate with a base station apparatus, the communication method comprising:

transmitting a physical uplink shared channel (PUSCH) repeatedly in each of a plurality of consecutive slots and over the plurality of consecutive slots; and configuring radio resource control (RRC) signaling including a first parameter and a second parameter in which the first parameter indicates a quantity of repetitions for the PUSCH repeatedly transmitted in each slot included in the plurality of consecutive slots and the second parameter indicates whether a first frequency hopping method or a second frequency hopping method is applied in which a frequency hopping is applied per the PUSCH repeatedly transmitted in the first frequency hopping method and the frequency hopping is applied per each slot included in the plurality of consecutive slots in the second frequency hopping method, wherein in a case of the second parameter indicating that the first frequency hopping method is applied, applying the frequency hopping based on the first parameter and the second parameter per the PUSCH repeatedly transmitted, and in a case of the second parameter indicating that the second frequency hopping method is applied, applying the frequency hopping based on the second parameter per each slot included in the plurality of consecutive slots.

6. A communication method for a base station apparatus configured to communicate with a terminal apparatus, the communication method comprising:

receiving a physical uplink shared channel (PUSCH) repeatedly in each of a plurality of consecutive slots and over the plurality of consecutive slots; and configuring radio resource control (RRC) signaling including a first parameter and a second parameter in which the first parameter indicates a quantity of repetitions for the PUSCH repeatedly transmitted in each slot included in the plurality of consecutive slots and the second parameter indicates whether a first frequency hopping method or a second frequency hopping method is applied in which a frequency hopping is applied per the PUSCH repeatedly transmitted in the first frequency hopping method and the frequency hopping is applied per each slot included in the plurality of consecutive slots in the second frequency hopping method, wherein in a case of the second parameter indicating that the first frequency hopping method is applied, receiving the PUSCH to which the frequency hopping is applied based on the first parameter and the second parameter per the PUSCH repeatedly transmitted, and in a case of the second parameter indicating that the second frequency hopping method is applied, receiving the PUSCH to which the frequency hopping is applied based on the second parameter per each slot included in the plurality of consecutive slots.

* * * * *